US012291440B2

(12) United States Patent
Schöttke et al.

(10) Patent No.: US 12,291,440 B2
(45) Date of Patent: May 6, 2025

(54) NARROW AISLE TRUCK WITH MEASURES FOR PREVENTING MAST VIBRATIONS AND FOR COMPENSATING FOR MAST DEFORMATIONS

(71) Applicant: Jungheinrich Aktiengesellschaft, Hamburg (DE)

(72) Inventors: Carsten Schöttke, Moosburg (DE); Hubert Bibernell, Landshut (DE); Michael Schönauer, Moosburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 790 days.

(21) Appl. No.: 17/352,803

(22) Filed: Jun. 21, 2021

(65) Prior Publication Data

US 2021/0395059 A1 Dec. 23, 2021

(30) Foreign Application Priority Data

Jun. 22, 2020 (DE) ..................... 10 2020 116 337.1

(51) Int. Cl.
*B66F 9/10* (2006.01)
*B66F 9/075* (2006.01)
*B66F 9/22* (2006.01)

(52) U.S. Cl.
CPC .......... *B66F 9/105* (2013.01); *B66F 9/07559* (2013.01); *B66F 9/22* (2013.01)

(58) Field of Classification Search
CPC ........ B66F 9/105; B66F 9/07559; B66F 9/20; B66F 9/22; B66F 9/082
See application file for complete search history.

(56) References Cited

U.S. PATENT DOCUMENTS 4,986,387 A * 1/1991 Thompson .......... B66F 9/07559 180/908
5,328,321 A * 7/1994 Moffett ............... B66F 9/07563 414/637

(Continued)

FOREIGN PATENT DOCUMENTS

DE 3617026 A1 * 11/1987
DE 3937404 A1 * 5/1991

(Continued)

OTHER PUBLICATIONS

European Application No. 21180600.5, Extended European Search Report mailed Dec. 8, 2021, 5 pages.

(Continued)

*Primary Examiner* — Michael R Mansen
*Assistant Examiner* — Michelle M Mudwilder
(74) *Attorney, Agent, or Firm* — Kilpatrick Townsend & Stockton LLP

(57) ABSTRACT

The present invention involves a narrow aisle truck comprising: a vehicle body having length and width directions; wheels assigned to the vehicle body and arranged on two axes running in the width direction and configured to drive and steer the truck; a drive system configured to exert an acceleration torque on at least one of the wheels; a mast extending substantially vertically with respect to the length direction of the vehicle body between the two axes; at least one detection unit to detect at least one state parameter; at least one actuator to cause a movement of the mast relative to the vehicle body; and a control unit to: determine a current state, determine an effect of an actuation of the at least one actuator on the current state, and activate the at least one actuator to reduce a difference between the determined current state and a predetermined target state.

31 Claims, 8 Drawing Sheets

(56) References Cited

U.S. PATENT DOCUMENTS

Figure 1A:
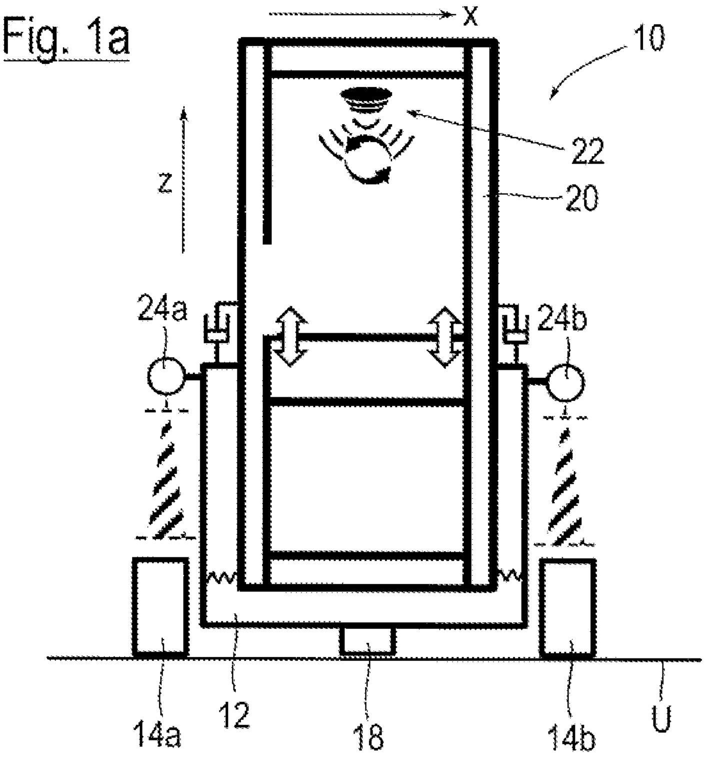

| | | | | |
|---|---|---|---|---|
| 8,140,228 | B2 * | 3/2012 | McCabe | B66F 9/24 701/50 |
| 9,002,557 | B2 * | 4/2015 | Goncalves | B66F 9/24 701/22 |
| 9,302,893 | B2 * | 4/2016 | Goncalves | B66F 17/003 |
| 10,308,489 | B2 * | 6/2019 | Magens | B66F 9/07586 |
| 10,597,271 | B2 * | 3/2020 | Magens | B66F 9/07 |
| 2009/0312875 | A1 | 12/2009 | Lehtonen et al. | |
| 2012/0239259 | A1 * | 9/2012 | McCabe | B62B 3/0612 701/50 |
| 2017/0036898 | A1 * | 2/2017 | Goncalves | B66F 17/003 |
| 2020/0071144 | A1 * | 3/2020 | Draayer | B66F 9/0759 |
| 2020/0399105 | A1 * | 12/2020 | Draayer | B66F 9/07504 |

FOREIGN PATENT DOCUMENTS

| | | | |
|---|---|---|---|
| DE | 4019075 | A1 | 12/1991 |
| DE | 102006012982 | A1 | 10/2007 |
| DE | 102008020592 | A1 | 10/2009 |
| DE | 102008020593 | A1 | 10/2009 |
| DE | 102016220810 | A1 | 4/2018 |
| EP | 1203743 | A1 | 5/2002 |
| EP | 1468958 | A2 | 10/2004 |
| EP | 1468958 | A3 | 12/2004 |
| EP | 2339376 | A1 | 6/2011 |
| JP | 2008081261 | A | 4/2008 |
| WO | 2008135039 | A2 | 11/2008 |

OTHER PUBLICATIONS

European Application No. 21180600.5, Office Action mailed Aug. 23, 2022, 6 pages.

Korean Patent No. 10 2020 116 337.1, Office Action, Jun. 30, 2021, No English translation available, 6 pages.

* cited by examiner

NARROW AISLE TRUCK WITH MEASURES FOR PREVENTING MAST VIBRATIONS AND FOR COMPENSATING FOR MAST DEFORMATIONS

CROSS REFERENCE TO RELATED APPLICATION

This application claims priority to German Patent Application No. 10 2020 116 337.1, filed in Germany on Jun. 22, 2020, the entire contents of which are hereby incorporated herein by this reference.

The present invention relates to a narrow aisle truck in which measures are taken to prevent mast vibrations and to compensate for mast deformations.

For the safe and efficient operation of forklift trucks which have a lift mast or a lift frame, it is necessary to suppress vibrations in the vehicle as far as possible, or even to prevent them proactively. For this purpose, it is known from the prior art, for example, to use the reach function in reach trucks to compensate for vibrations of the lift mast which can occur due to various influences, in particular uneven floors and the inertia of a load being carried.

Examples of measures for damping vibrations in reach trucks are known, for example, from DE 10 2008 020 593 A1 and DE 10 2008 020 592 A1, in each of which mast vibrations are damped by means of bracing. However, such a possibility is not available in the case of firmly clamped lift masts, such as those used in the case of counterbalanced forklifts and in particular narrow aisle trucks (high-bay trucks). As such, the concepts discussed above cannot be easily transferred due to the fundamentally different designs of reach trucks and narrow aisle trucks, so that efficient damping of mast vibrations and similar disturbances in narrow aisle trucks has not yet been achieved.

In particular, a typical problem of narrow aisle trucks is that—due to the great lift heights resulting from the development of modern high bays and high-bay warehouses and the associated increase in efficiency, and due to the unfavourable leverage angles of lift masts which are extended very far vertically—vibrations of these lift masts are very significant, and deformations of the lift masts when loads change contribute to a lack of stability in the corresponding vehicle. Due to the resulting unstable behaviour of the vehicles, they often cannot be operated at their theoretical maximum speeds and turnover rates, so that there is untapped potential, and a more cost-efficient operation of such vehicles would be possible.

To compensate for this shortcoming and to address the steady increase in lifting heights, approaches to-date have centred on making the driving surface for corresponding industrial trucks as flat as possible in order to prevent the occurrence of vibrations or tilting of the industrial trucks moving on the ground from the outset. However, this measure requires extensive management and regular maintenance of the corresponding driving surfaces, and many operators of such logistics centres tend a priori to shy away from measures taken for the building, since it is desirable for them to invest only a small amount of effort in their infrastructure in order to reduce costs and maintain their flexibility.

It is therefore the object of the present invention to provide an improved narrow aisle truck in which measures are taken to reduce mast vibrations and mast deformations, which ultimately allow the vehicle according to the invention to be operated with increased efficiency.

For this purpose, the narrow aisle truck according to the invention comprises a vehicle body having a length direction and a width direction, the length direction corresponding to the primary direction of travel of the narrow aisle truck, wheels assigned to the vehicle body, arranged as two axes running in the width direction of the narrow aisle truck, and which are configured to drive and steer the narrow aisle truck while driving on a driving surface, a drive system which is configured to exert an acceleration torque on at least one of the wheels, a mast extending substantially vertically with respect to the length direction of the narrow aisle truck between the two axes, wherein the mast is movably mounted relative to the vehicle body, with respect to at least one degree of freedom of movement, by means of a bearing arrangement, at least one detection unit which is configured to detect at least one state parameter of the narrow aisle truck and/or its surroundings and to output corresponding data, at least one actuator which is configured to cause a movement of the mast relative to the vehicle body corresponding to the at least one degree of freedom, and a control unit which is operatively coupled to the at least one detection unit and to the at least one actuator, and is configured to determine a current state of the narrow aisle truck based on the at least one state parameter detected by the at least one detection unit, to determine an effect of an actuation of the at least one actuator on the current state, and to activate the at least one actuator in such a way that a difference between the determined current state and a predetermined target state is reduced.

According to the invention, the detection of at least one state parameter and a determination of a current state based on this detected state parameter creates the possibility of moving the determined current state closer to a predetermined target state by moving the mast along its at least one degree of freedom. It goes without saying that the degree of freedom of movement can be both a translational and a rotational degree of freedom and, in the most general case, can even include embodiments in which the bearing arrangement only has to allow the mast to be deformed, without the mast being displaced at the bearing point, while the target state can correspond, for example, to a vibration-free state in which the mast is aligned perfectly vertically, regardless of whether the driving surface may have a slope. It is therefore understood that the vertical direction often cited in the following for components of the narrow aisle truck should be related to the reference system of the vehicle and not to the absolute space. Accordingly, the definition of the target state can substantially be defined by any suitable parameterisation with regard to numerous instantaneous state properties of the vehicle.

In principle, in the most general form of the present invention, a pivoting or inclination of the mast about all three main axes can take place, be driven, and/or detected, i.e. a lateral inclination about an axis along the length direction of the narrow aisle truck, a longitudinal inclination about an axis along the width direction of the narrow aisle truck, and a torsion about the vertical direction, wherein the inclination or torsion axes themselves are initially defined, even in terms of their position relative to the mast.

Furthermore, there is the possibility that the control unit can also be operatively coupled to the drive system and can be configured to determine an effect of a modulation of the acceleration torque exerted by the drive system on at least one wheel on the current state, and to control the drive system in such a way that a difference between the determined current state and a predetermined target state is reduced. Due to common vehicle geometries, this can involve a modulation of the acceleration torque, which of course can include not only positive acceleration but also deceleration of the narrow aisle truck, to counteract vibrations or pitching movements of the mast about an axis parallel to the width direction of the vehicle.

Different approaches can be followed for the design of the detection unit in connection with the control or regulation concept implemented by the control unit, wherein, for example, a defined level of the vehicle and a defined actuator position can be used as the reference variable. In the context of this example, a current level is determined with the aid of one of the detection units, and a comparison can take place with a future level predicted with the aid of suitable detection units. From these disturbance variables, the control unit can then determine an actuator reaction which takes into account both the current and future discrepancies between the current state and the target state, and can use this to minimise them.

For this purpose, in particular the actuating variable as well as its direction and its course over time are determined and implemented. In configurations having a plurality of actuators, the actuators can also be arranged and controlled in opposite directions in order to reduce the reaction time. Of course, other methods are also conceivable, for example simulations of the vehicle geometry in real time, in which the at least one currently detected state parameter, and a modelling of the vehicle geometry available to the control unit, can be included, for which corresponding simulations of possible actuator activations can be used in a suitable manner. In this context, in particular, detected state parameters pertaining to the surroundings of the narrow aisle truck can also be incorporated, for example pertaining to locally uneven floors or slopes.

As such, in one embodiment, the at least one detection unit can be configured to detect an inclination of the vehicle body, the mast and/or the driving surface relative to the horizontal, in particular an inclination transverse to the length direction of the narrow aisle truck.

Alternatively or additionally, however, the at least one detection unit can also be configured to detect an acceleration and/or a vibration of the vehicle body and/or of the mast. In particular, in cases in which compensatory movements of the mast are to be made proactively, thereby preventing the occurrence of vibrations in advance, it can also be desirable if the at least one detection unit is configured to detect a relative or absolute position of the narrow aisle truck, wherein it can have an association with a memory unit which is operatively coupled to a control unit, and in which topology data is available regarding the driving surface on which the narrow aisle truck can drive. Known technologies such as the use of GPS or local transponders can be used to detect the relative and/or absolute position of the vehicle, or odometric or similar measurements can be carried out, as well as any combination of such methods. Of course, for a verification or iterative improvement of the topology data, it is possible to detect the driving surface or record the detected state parameters over time or, depending on a position of the narrow aisle truck, for example to undertake machine learning with the help of an implementation of artificial intelligence, with respect to the surroundings of the vehicle or its reaction to disturbances and effects of operations that can be carried out by the at least one actuator.

To optimise the actuator reaction to detected or predicted disturbances, it can also be advantageous if the control unit is also configured to classify possible disturbances on the basis of the at least one state parameter detected by the at least one detection unit. In particular, incoming disturbance variables can be classified with regard to their frequency and, for example, divided into long-wave and short-wave disturbances. In this way, both short-wave interference components, such as rocking to the side, and long-wave interference components, such as pitching of the mast, can be superimposed and minimised.

There are also different possibilities according to the invention with regard to the design of the at least one actuator, the choice of the most suitable actuator depending on various parameters in the design of the narrow aisle truck according to the invention, for example the desired or required response behaviour and the required actuation path. In particular, the at least one actuator can comprise at least one of: a single-acting hydraulic cylinder, a double-acting hydraulic cylinder, a linear motor, a stepping motor, a threaded spindle, a rack drive, an electromagnet and a piezo element.

What has proven to be particularly suitable for many possible embodiments of the narrow aisle truck according to the invention is an actuator which comprises a hydraulic cylinder with variable spring preload, wherein, for large moving masses, the static equilibrium or the zero position is compensated by preloading the spring with a piston via hydraulic pressure applied to a first connection. The actual actuation then takes place via a second pressure connection, the energy required to trigger a movement of the mast being reduced by the work stored in the spring.

Different embodiments are also conceivable with regard to the design of the bearing arrangement and, consequently, the connection of the mast to the vehicle body and the resulting degree of freedom, it being possible first of all to provide the bearing arrangement with a damping element which is configured to dampen a movement of the mast relative to the vehicle body along at least one direction.

In a first possible embodiment, the mast can be mounted in a floating manner, with respect to a bearing plane which extends substantially vertically and in the width direction of the narrow aisle truck, by means of the bearing arrangement, wherein the actuator or at least one of the actuators can be configured to displace the mast in a vertical direction relative to the vehicle body, wherein preferably two actuators can be provided which are arranged on opposite sides of the mast.

In this way, the mast is able to separately perform vertical translational movements and inclination movements about axes oriented in the length direction of the narrow aisle truck, as well as movements resulting from the superposition of the two directions. In this way, different types of stimuli can be responded to as required; for example the short-wave stimuli already described above can be combated by lateral tilting movements of the mast, which can be achieved in the embodiment, for example, by a movement in opposite directions of the two actuators arranged on both sides of the mast, while the pitching movements caused by the long-wave disturbances also already mentioned can be approximately compensated for by a vertical movement of the mast, which is achieved by synchronous actuator movements. As such, by suitable control of the actuator or actuators, the floor profile can be identically reproduced, or this profile can be followed, which can correspond to a superposition of the actuator movements against short-wave and long-wave interference.

As an alternative or additional measure, provision can be made for the bearing arrangement itself to be arranged so as to be movable with respect to the vehicle body by the actuator or one of the actuators.

Because, with a combination of the two previously described measures by the actuator or the actuators for displacing the mast in the vertical direction, an effective axis running in a substantially horizontal direction is formed with such a coupling of the actuator or the actuators to the mast, such that an actuation of the actuator for movement of the bearing arrangement relative to the vehicle body leads to a pivoting of the mast about the effective axis, another mechanism can be created to combat pitching movements of the mast. It goes without saying that the coupling of the actuators for displacing the mast in the vertical direction must be designed in a suitable manner, for example by means of radial pivot bearings, in order to allow the mast to pivot about the effective axis.

In a further embodiment, the mast can be mounted in a floating manner, with respect to a bearing plane which extends substantially vertically and in the width direction of the narrow aisle truck, by means of the bearing arrangement, wherein a further bearing arrangement can also be provided which is configured to allow the mast to pivot about an axis which extends perpendicular to the bearing plane, wherein the pivoting about this axis can be driven by a correspondingly arranged actuator. Here, for example, it can be contemplated to rotatably support the further bearing arrangement by means of pivot levers of the same type, provided symmetrically on both sides between the vehicle body and the mast, the axes of which are perpendicular to the bearing plane. In this way, in the basic position, a parallelogram aligned parallel to the width direction and symmetrically to the bearing plane can be formed by means of these pivot levers. Since an actuator now exerts a force on the mast outside of the width axis lying at the level of the pivot levers, in the direction of this width axis, a pivot and tilt movement of the mast along the lever radii can result—which leads to a very agile response behaviour and a resulting very low required actuator force.

Furthermore, the further bearing arrangement can be configured to additionally allow the mast to pivot about a further axis lying in the bearing plane, wherein the bearing arrangement can be arranged to be movable with respect to the vehicle body by one of the actuators. In this case, by analogy with the embodiment described above, an effective axis is formed by the further axis, about which a pitching movement of the mast can take place, which can lead to an exactly determined degree of freedom for pivoting the mast and an increased possible level compensation, with a simultaneously smooth bearing.

The further bearing arrangements and the actuator for pivoting the mast can be arranged on opposite sides of the mast with respect to the width direction of the narrow aisle truck, so that the pivot axis running perpendicular to the bearing plane is on the edge of or even outside of the mast itself.

In this embodiment, too, the bearing arrangement can be arranged to be movable with respect to the vehicle body by one of the actuators, and the actuator for pivoting the mast and the further bearing arrangement can form an effective axis running in a substantially horizontal direction with such a coupling of this actuator and the further bearing arrangement to the mast, such that an actuation of the actuator to displace the bearing arrangement relative to the vehicle body leads to a pivoting of the mast about the effective axis.

According to a further embodiment, the mast can be mounted by means of the bearing arrangement in a manner only allowing vertical movement, and can be mounted by means of a further bearing arrangement in a manner allowing movement only with respect to the width direction of the narrow aisle truck, wherein the actuator or one of the actuators is configured to displace the mast in the region of the further bearing arrangement in the width direction of the narrow aisle truck, so as to cause it to pivot by elastic torsion of the mast. In this context, it should be noted that the further bearing arrangement can have a small, limited degree of freedom in the vertical direction; however, primarily a movement in the width direction of the narrow aisle truck is envisaged. This embodiment has the advantage of a very simple and inexpensive configuration of the bearing arrangement and also of the further bearing arrangement, it being possible to utilise known configurations of masts and base frames of narrow aisle trucks.

In this embodiment, too, the bearing arrangement can furthermore be arranged to be movable with respect to the vehicle body by one of the actuators, and the further bearing arrangement forms an effective axis running in a substantially horizontal direction with such a coupling of the further bearing arrangement thereto, such that an actuation of the actuator to move the bearing arrangement relative to the vehicle body leads to a pivoting of the mast about the effective axis.

In yet another embodiment, a further bearing arrangement can be provided and configured to allow the mast to pivot about a stationary pivot axis running in the length direction of the narrow aisle truck, wherein the actuator or one of the actuators can be configured to cause the mast to pivot about the pivot axis. In contrast to the embodiment described above with a floating mount of the mast, which also allows a pivoting movement of the mast about an axis running in the length direction of the narrow aisle truck, the position of the pivot axis is substantially fixed in this further embodiment.

In this embodiment, the further bearing arrangement can also be configured to allow a movement of the mast along the pivot axis, and two actuators can be provided which are arranged to act on the mast at an angle to one another, wherein the actuators preferably form a triangle together with the width direction of the narrow aisle truck, in particular an isosceles or equilateral triangle. In this embodiment, the degrees of freedom of the mast are therefore exactly determined, while on the other hand only a few bearing points have to be provided. Rotation along an axis running in the length direction of the vehicle also makes it possible to compensate for greater level fluctuations, while on the other hand smooth-running bearings can be used.

In a further variant, a further bearing arrangement can be provided which comprises an arcuate linear guide or a slewing ring bearing which is configured to allow pivoting of the mast about a pivot point provided centrally on the mast in the width direction of the narrow aisle truck, wherein the actuator or one of the actuators is configured to cause the mast to pivot about the pivot point. By using such an arcuate linear guide or such a slewing ring bearing, the degree of freedom for pivoting the mast is exactly determined and no additional translation can occur in the vertical direction. A torsion of the mast about the vertical axis is also substantially ruled out. On the other hand, however, due to the rotation about the pivot axis oriented in the length direction of the vehicle, a high degree of level compensation is possible with, at the same time, a smooth-running bearing.

In this embodiment, the further bearing arrangement can also be arranged to allow the mast to pivot about an effective axis running substantially horizontally in the width direction of the narrow aisle truck through the pivot point, wherein a further actuator can be arranged in such a way that an actuation of the further actuator leads to a pivoting of the mast about the effective axis. In this variant, too, it must be ensured that the further bearing arrangement permits the additional pivoting movement; in particular, the arcuate linear guide or the slewing ring bearing can be intended to be movable as a whole. The additional degree of freedom of movement available in this way can be used during operation of the narrow aisle truck in particular to compensate for pitching movements of the mast, which often occur in the context of the long-wave disturbances already mentioned above.

In an alternative variant, the bearing arrangement can be configured in such a way that the mast can be pivoted about a stationary pivot axis running in the length direction of the narrow aisle truck, the actuator or one of the actuators being configured to cause the mast to pivot about the pivot axis, wherein the pivot axis is arranged centrally on the underside of the mast with respect to the width direction of the narrow aisle truck, for example with respect to the vertical direction in the region of the wheels of the narrow aisle truck.

In this case, a further bearing arrangement can be provided vertically above the bearing arrangement, allowing a movement of the mast in the width direction of the narrow aisle truck; for this purpose, it can in particular comprise a roller guide. This configuration of the further bearing arrangement allows a robust guidance of the mast and compensates for misalignments between the mast and the vehicle body.

In particular, the actuator for pivoting the mast about the pivot axis and the further bearing arrangement can form an assembly, for example because the mentioned roller guide can also be operated as an actuator for pivoting the mast.

As an alternative or in addition, the bearing arrangement in this variant can also be configured to allow the mast to pivot about an effective axis running substantially in the width direction of the narrow aisle truck, wherein the further bearing arrangement can be arranged so as to be movable relative to the vehicle body by a further actuator, such that an activation of the further actuator causes the mast to pivot about the effective axis. In a manner analogous to the variant described above, the additional degree of freedom achieved by this measure for the mast can be used, in particular, to suppress long-wave disturbances in the form of pitching movements of the mast.

Finally, it should be pointed out that in the variants described last, the bearing arrangement can comprise a slewing ring bearing or a bearing pin.

Figure 2:
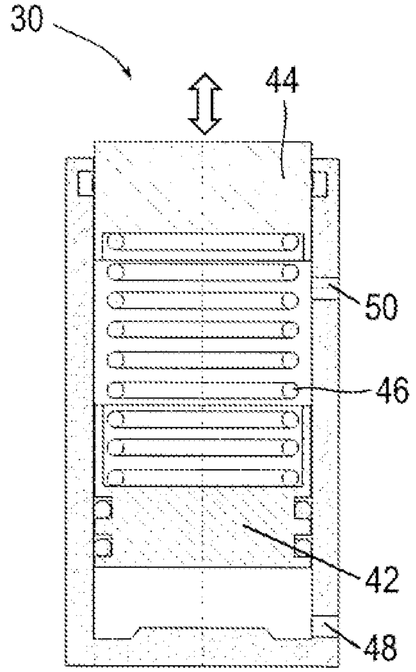
Figure 1B:
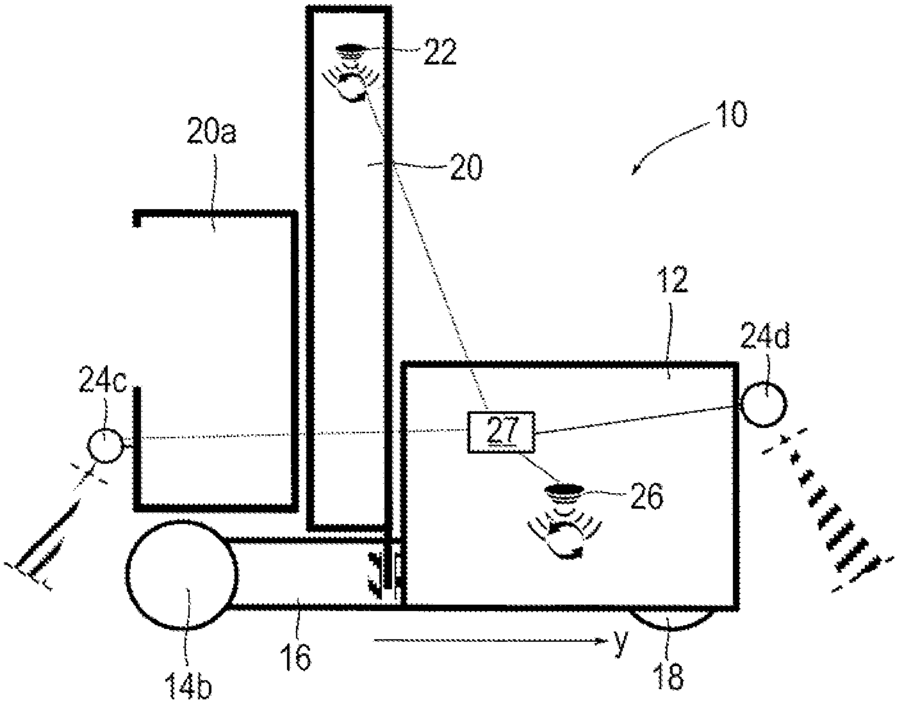
Figure 3A:
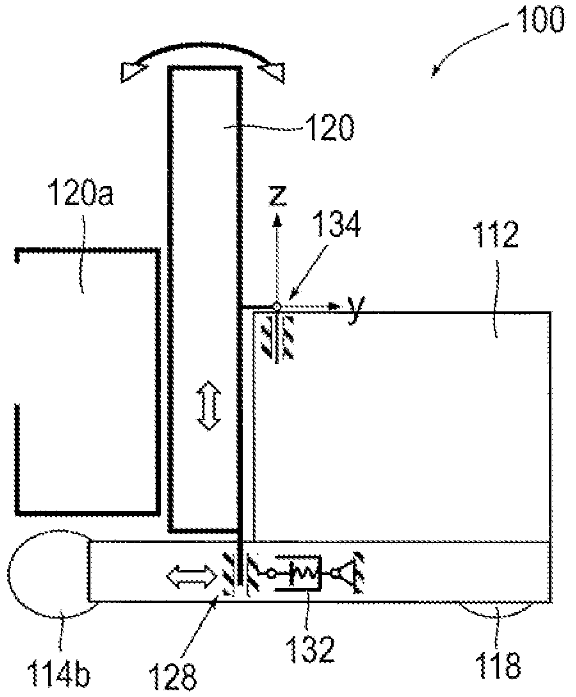
Figure 3B:
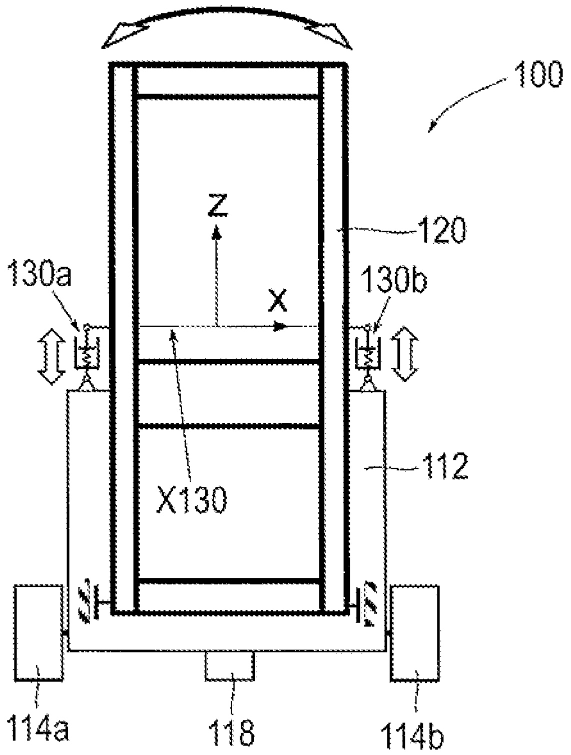
Figure 4A:
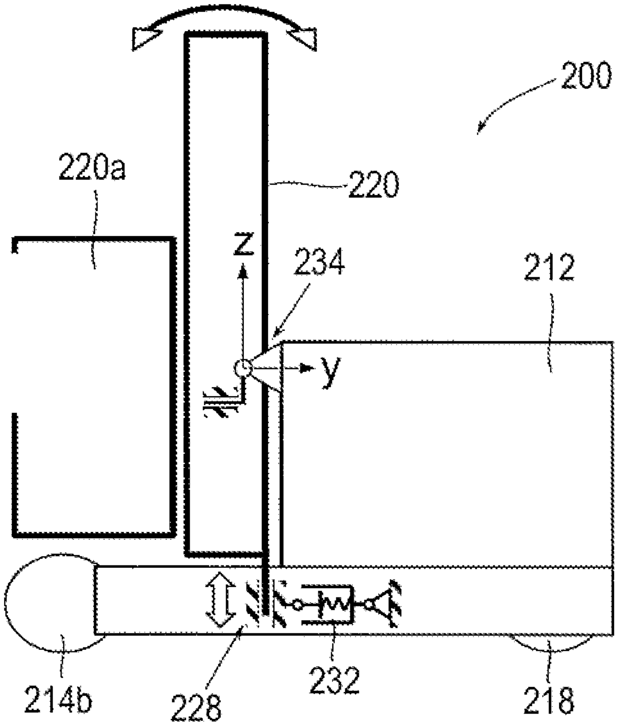
Figure 4B:
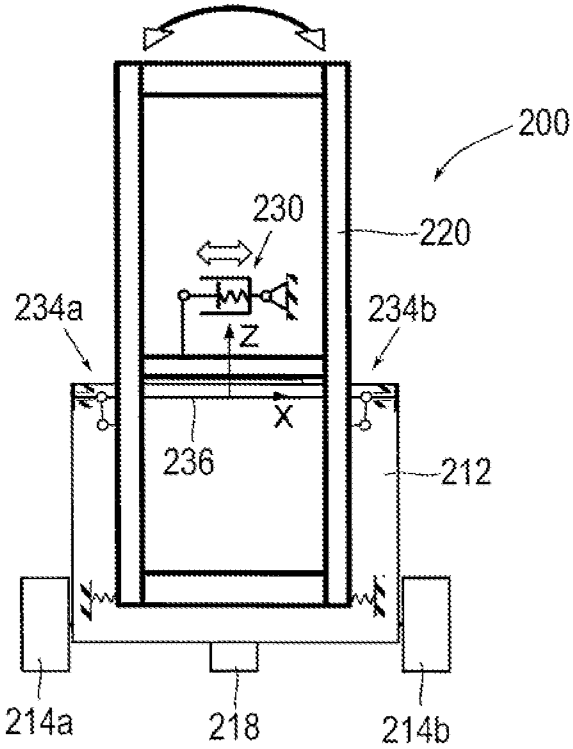
Figure 5A:
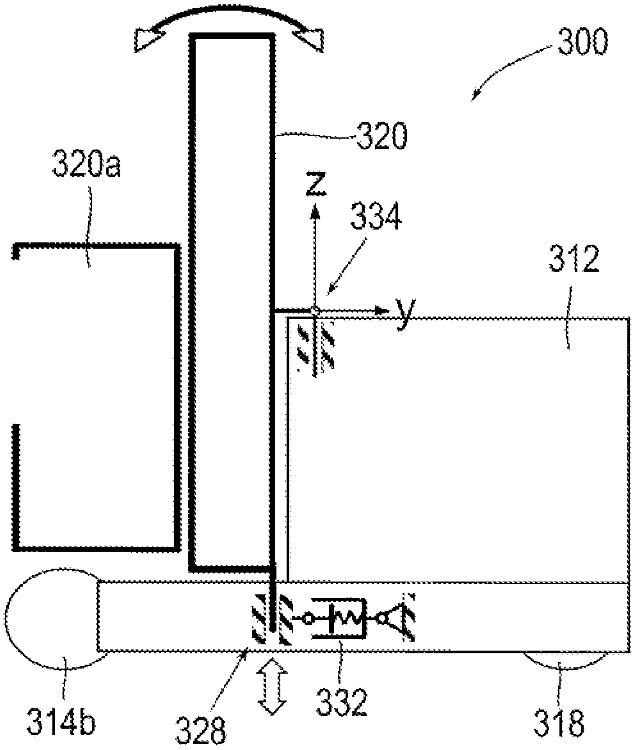
Figure 5B:
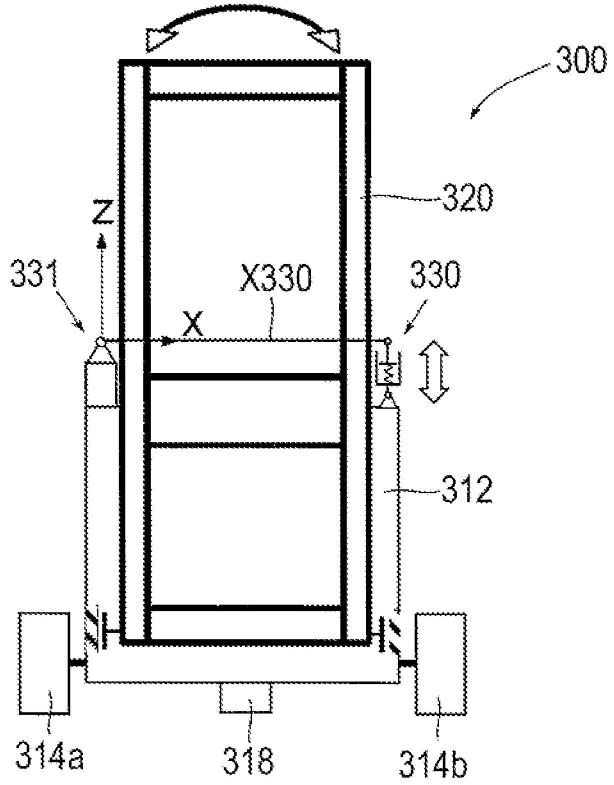
Figure 6A:
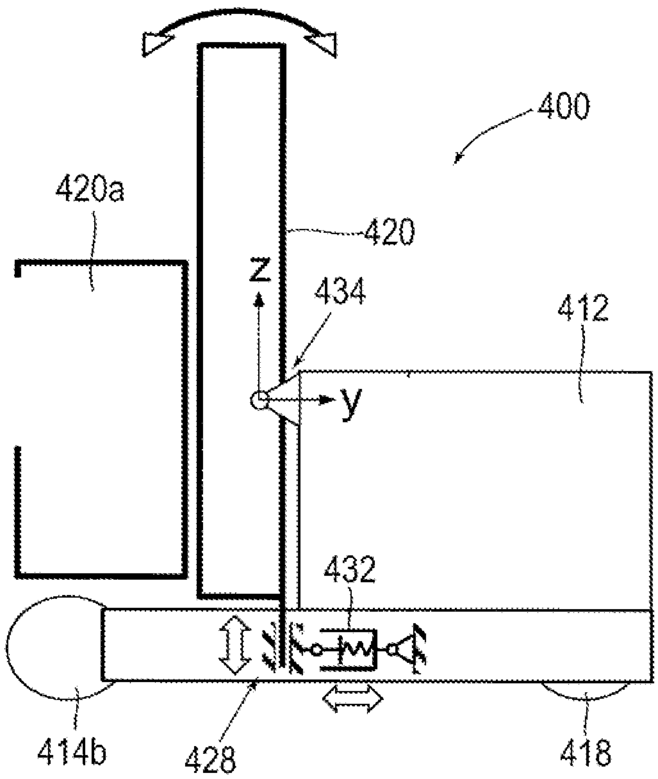
Figure 6B:
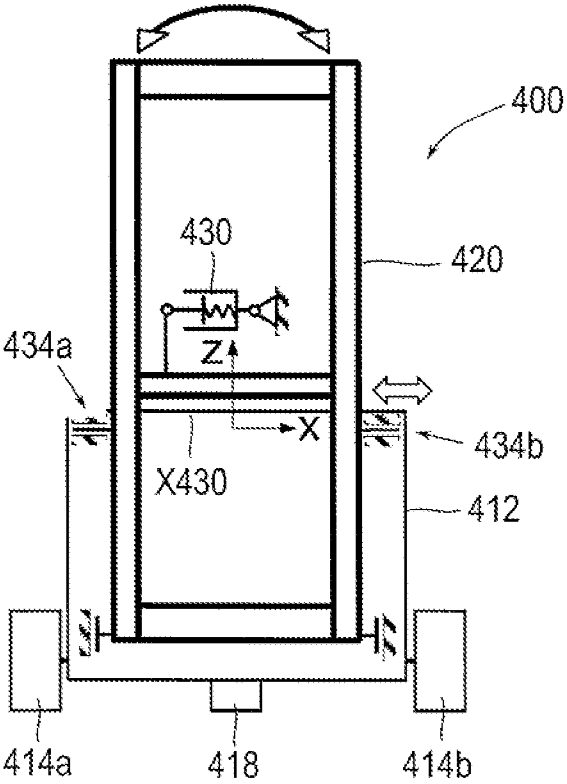
Figure 7A:
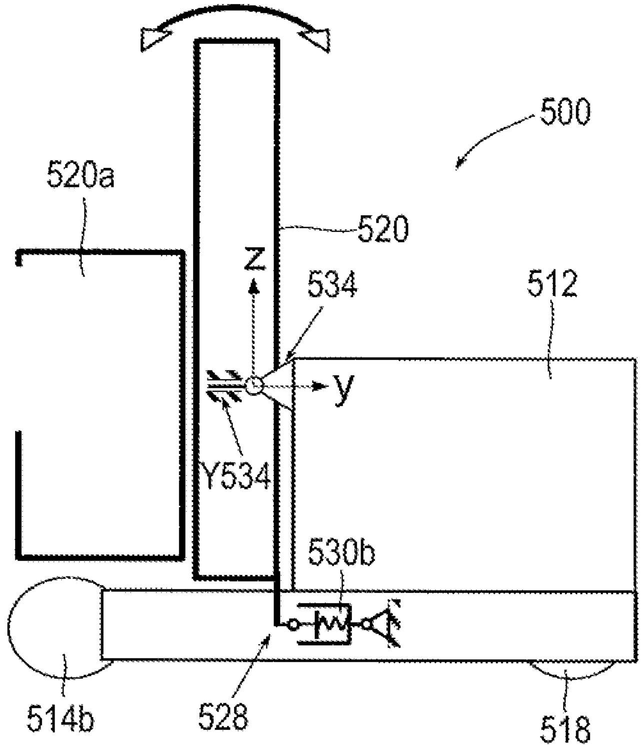
Figure 7B:
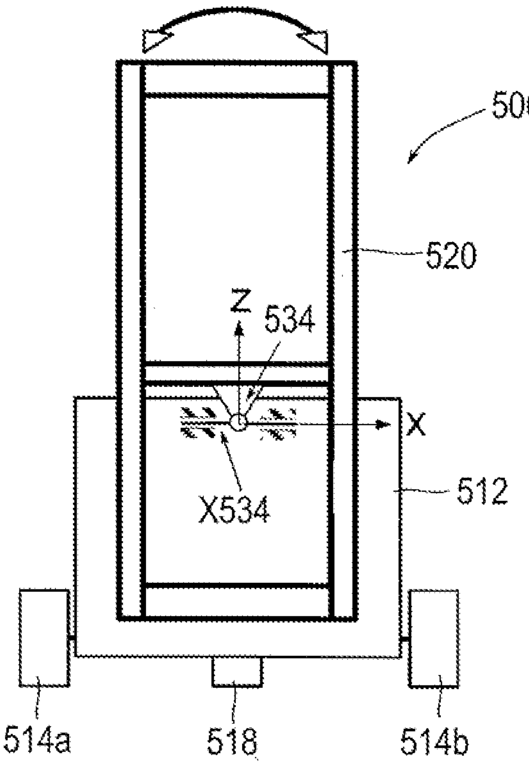
Figure 7C:
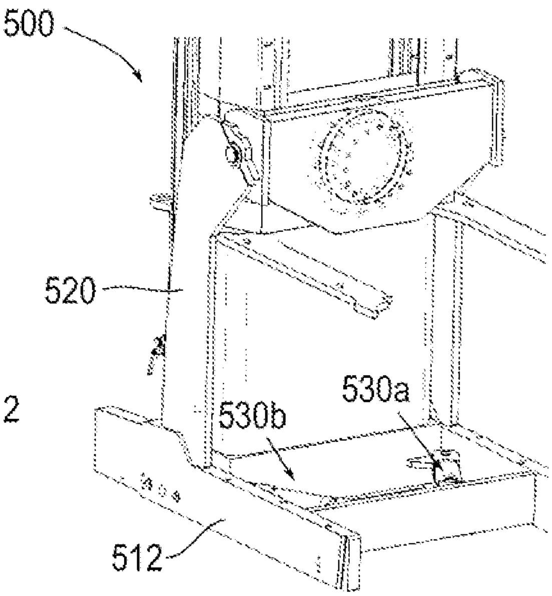
Figure 8A:
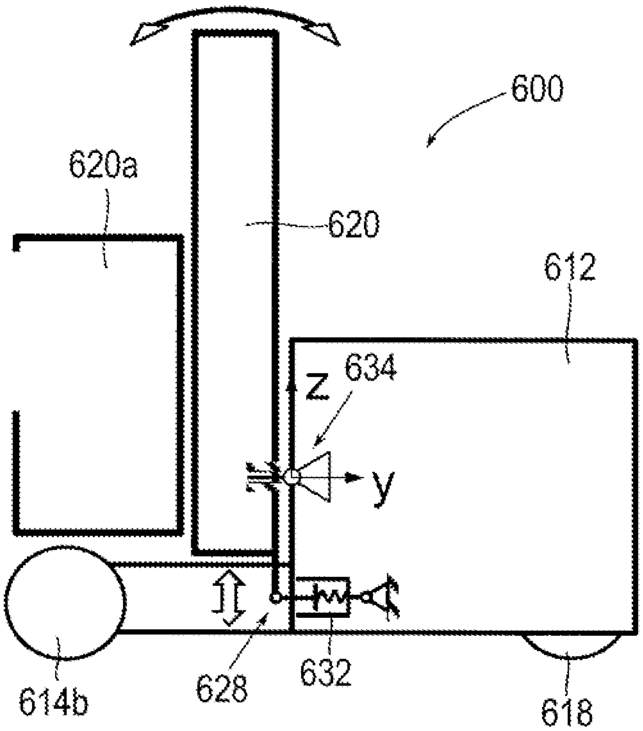
Figure 8B:
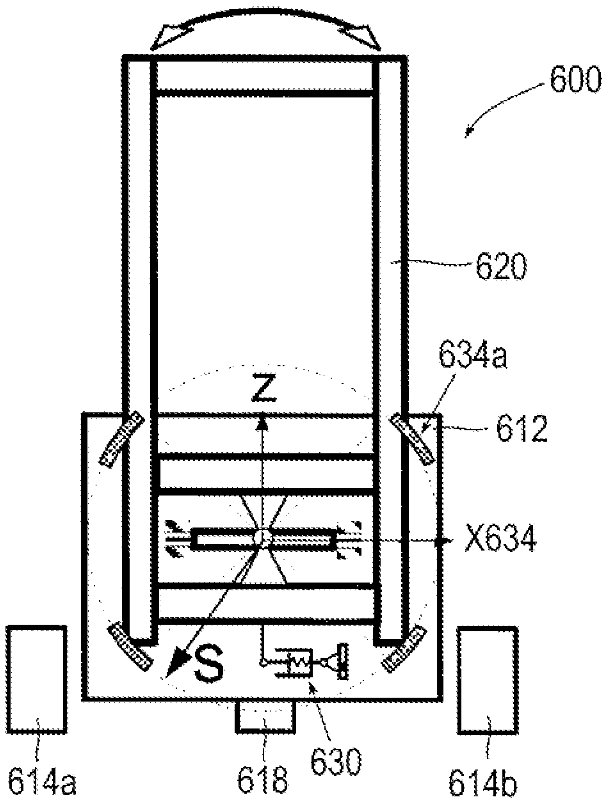
Figure 8C:
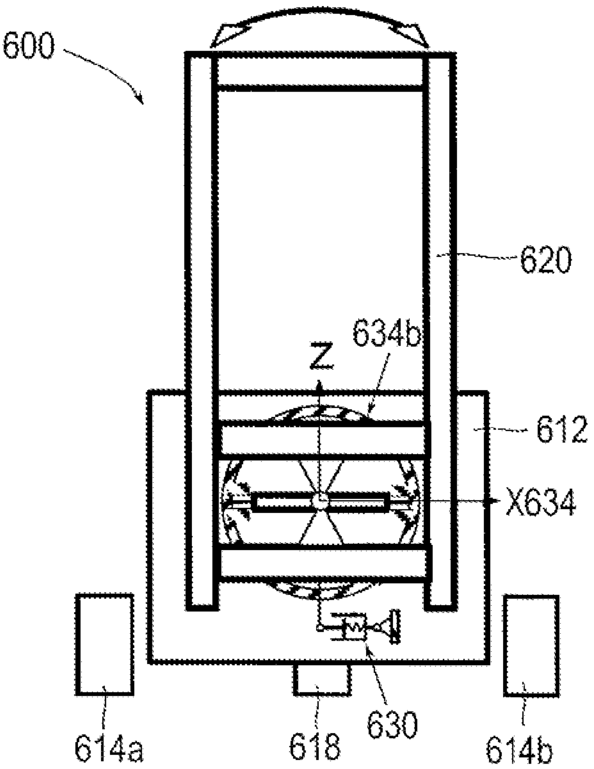
Figure 9A:
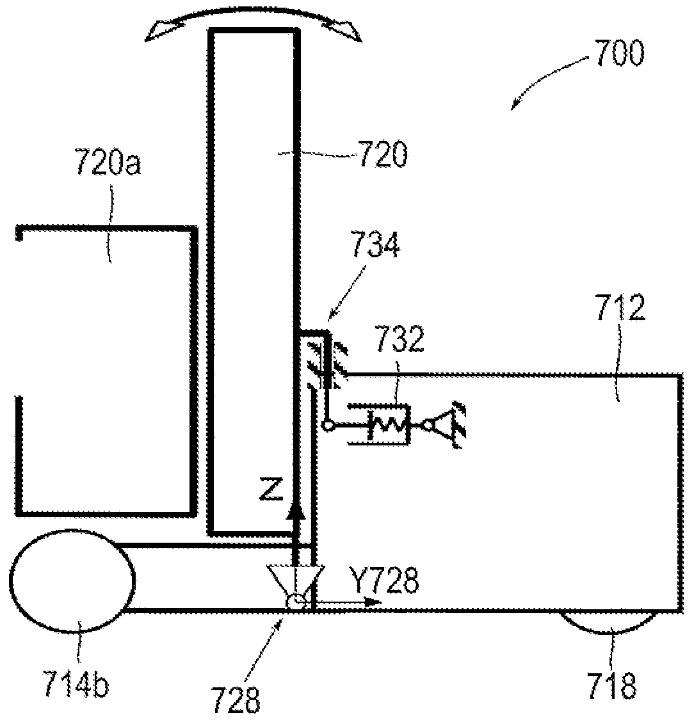
Figure 9B:
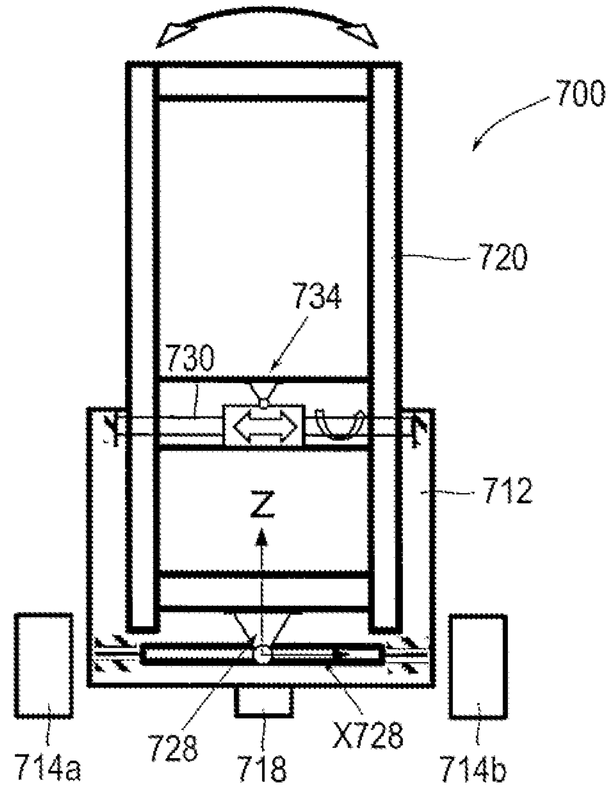

Further features and advantages of the present invention will become clear from the following description of embodiments thereof when considered together with the accompanying drawings. In detail, in the drawings:

FIGS. 1*a* and 1*b* are schematic views of an embodiment of a narrow aisle truck according to the invention, having a plurality of detection units provided thereon;

FIG. 2 is a schematic view of a hydraulic actuator with variable spring preload, as can be used in the various embodiments of narrow aisle trucks according to the invention;

FIGS. 3*a* and 3*b* show a first embodiment of a narrow aisle truck according to the invention in two schematic views;

FIGS. 4*a* and 4*b* show a second embodiment of a narrow aisle truck according to the invention in two schematic views;

FIGS. 5*a* and 5*b* show a third embodiment of a narrow aisle truck according to the invention in two schematic views;

FIGS. 6*a* and 6*b* show a fourth embodiment of a narrow aisle truck according to the invention in two schematic views;

FIGS. 7*a* to 7*c* show a fifth embodiment of a narrow aisle truck according to the invention in three schematic views;

FIGS. 8*a* to 8*c* show a sixth embodiment of a narrow aisle truck according to the invention in two schematic views; and FIGS. 9*a* and 9*b* show a seventh embodiment of a narrow aisle truck according to the invention in three schematic views.

In FIGS. 1*a* and 1*b*, a narrow aisle truck according to the invention is first shown schematically in two different views. The narrow aisle truck is denoted by the reference numeral 10 and comprises a vehicle body 12 having a front pair of wheels 14*a* and 14*b*, which are provided on different longitudinal members 16, and a driven and steered rear wheel 18, via which the vehicle 10 stands on a driving surface U.

The axes of rotation of the front wheels 14*a* and 14*b* and of the rear wheel 18 each run in the width direction x of the vehicle 10, while the straight-ahead direction of travel of the vehicle 10 is also referred to as the length direction y.

Between the two axes of the front wheels 14*a* and 14*b* and of the rear wheel 18 in the length direction y of the vehicle 10, a mast 20 extends in a substantially vertical (z) direction, to which, in the embodiment shown in FIGS. 1*a* and 1*b*, a driver's cab 20*a* is connected in a vertically displaceable manner.

Due to its design with the mast 20 arranged between the axles of the front wheels 14*a* and 14*b* and the rear wheel 18, the narrow aisle truck 10 shown here is primarily suitable for use in logistics facilities in which only narrow aisles are provided between high bays in which goods are stored and can be picked by an operator located in the driver's cab 20*a*. It goes without saying that in alternative variants the narrow aisle truck 10 could also be designed as a driverless vehicle and consequently could be operated autonomously or remotely, with the driver's cab 20*a* being replaced by a corresponding structure in such variants. Furthermore, it goes without saying that the vehicle 10 can also include numerous other components which are customary for such vehicles, for example a hydraulic system which can supply some of the actuators described below.

With regard to different embodiments of the attachment and mounting of the mast 20 with respect to the vehicle body 12 by means of different variants of bearing arrangements, reference is made to the following drawings; in connection with FIGS. 1*a* and 1*b*, first we will discuss various detection units which can be used to detect at least one state parameter of the narrow aisle truck 10 and/or its surroundings, and which can be provided in different embodiments of such narrow aisle trucks 10 either singly or in any combination.

In this case, FIG. 1*a* first shows an inclination sensor 22 in the region of the mast 20, which can be designed, for example, as a multi-axis acceleration sensor and consequently can detect inclinations of the mast 20 about at least one of the x, y and z axes. Furthermore, respective ground sensors 24*a* and 24*b* are provided on both sides of the vehicle 10 in the width direction x, which sensors detect the properties of the driving surface U to the side of the vehicle 10, and can detect unevenness thereof.

In a similar way, further ground sensors 24*c* and 24*d* are shown in FIG. 1*b*, which can undertake a corresponding detection of the driving surface U in front of and behind the vehicle 10 in the length direction y thereof. In addition, FIG.. 1*b* shows a further acceleration or inclination sensor 26 in the region of the vehicle body 12, which can be designed as a three-axis acceleration sensor analogously to the sensor 22 assigned to the mast 20.

Further sensors not shown here but which can also be used in narrow aisle trucks according to the invention include position sensors for a relative or absolute position of the narrow aisle truck in space, for example receivers for GPS or for position determination information output by local transmitters, acceleration and speed sensors for detecting a driving status of the narrow aisle truck 10, etc.

According to the regulation or control concept of the vehicle according to the invention, the individual detection units deliver their data to a control unit 27, indicated only schematically in the drawings, which determines a current state of the vehicle 10 on the basis of the state parameters supplied in this way, determines an effect on this current state of an actuation of at least one of the actuators described below, and then controls the at least one actuator in such a way that a difference between the determined current state and a predetermined target state is reduced—wherein the latter can be defined, for example, in such a way that the mast 20, regardless of possible inclinations or unevenness of the driving surface U, and thus of the vehicle body 12 of the vehicle 10, is kept in a perfectly vertical orientation.

For this purpose, the control unit 27 can also be operatively coupled to a drive system, also not shown, of the narrow aisle truck 10, which, for example, exerts a drive torque on the vehicle 10 by means of the steered and driven rear wheel 18, and which can also cause the vehicle 10 to decelerate through braking interventions. For this purpose, the control unit 27 can determine the effect of a modulation of the acceleration torque exerted by the drive system on the rear wheel 18 on the current state, and control the drive system in such a way that a difference between the determined current state and a predetermined target state is reduced.

For the description of an example of a particularly suitable actuator type for the actuations of the mast 20 of the narrow aisle truck 10 described below, reference is also made to FIG. 2, in which a hydraulic actuator 30 with variable spring preload is shown. This comprises a first piston 42 and a second piston 44, the second piston 44 being provided to effect the actual power transmission to the corresponding component of the narrow aisle truck 10. In contrast, by means of the first piston 42, a preload is exerted on a spiral spring 46 arranged between the two pistons 42 and 44, due to a hydraulic pressure being supplied to a first hydraulic connection 48. This allows the static equilibrium or the zero position of the cylinder 30 to be established, wherein a further application of hydraulic pressure to a second pressure connection 50 triggers a movement of the second piston 44 and reduces the energy required for this by the amount of the work stored in the spring.

A first embodiment of a narrow aisle truck according to the invention, in which such an actuator can be used, is shown in FIGS. 3*a* and 3*b* and denoted there by the reference numeral 100. Here, and in the following description of further embodiments, for example with regard to the placement of possible detection units and also the directions and axes in the vehicles, reference is made to the description of FIGS. 1*a* and 1*b*, wherein equivalent or identical components of the embodiments each have the same reference numeral, increased by a multiple of 100; their description is omitted in detail in various places.

Accordingly, the narrow aisle truck 100 comprises a vehicle body 112 and a mast 120, as well as two front wheels 114*a* and 114*b* and a rear wheel 118. A driver's cab 120*a* is also attached to the mast 120 in a vertically displaceable manner. Furthermore, the mast 120 itself is movably mounted relative to the vehicle body 112 by means of a bearing arrangement 128—in the embodiment shown in FIGS. 3*a* and 3*b*, mounted in a floating manner in particular with regard to the x and z directions, i.e. freely, at least within a predetermined range in these directions, or mounted to be movable in a damped manner and fixed with respect to the y direction.

It is thus possible, by means of two first actuators 130*a* and 130*b* arranged between the mast 120 and the vehicle body 112, to displace the mast 120 at its connection points to the actuators 130*a* and 130*b* by a predetermined amount in the z direction in relation to the vehicle body 112 in each case, which is determined by the maximum stroke of the two actuators 130*a* and 130*b*. In this way, when the two actuators 130*a* and 130*b* are activated asymmetrically, the mast can also be tilted by a predetermined amount in the x-z plane. Since the two actuators 130*a* and 130*b* are also connected to the mast 120, for example by means of radial spherical plain bearings, in a pivotable manner, the imaginary connecting axis of the two connecting points of the actuators 130*a* and 130*b* creates an effective axis X130, which runs in the x direction and about which a pivoting of the mast 120 is also possible, which corresponds to a pitching movement of the mast 120.

In order to drive this pivoting or pitching, a further actuator 132 is also provided in the narrow aisle truck 100, which allows the bearing arrangement 128 to be displaced relative to the vehicle body 112 in the y direction.

Thus, in the embodiment of a narrow aisle truck according to the invention shown in FIGS. 3*a* and 3*b*, a displacement of the mast 120 in the vertical (z) direction, an inclination or pivoting of the mast 120 in the plane spanned by the x and z directions, as well as a pitching of the mast 120 about the effective axis X130 are possible, so that a large number of possible vibrations or disturbances of the mast 120 with respect to its predefined target state can be compensated for or combated.

A second embodiment of a narrow aisle truck according to the invention, in which actuators of the type shown in FIG. 2 can also be used, is shown in FIGS. 4*a* and 4*b*, denoted there by the reference numeral 200.

In this second embodiment, the mast 220, analogously to the mast 120 of FIGS. 3*a* and 3*b*, is mounted in a floating manner with respect to a bearing plane by means of a bearing arrangement 228 which extends in the x and z directions. Furthermore, a further bearing arrangement 234 is provided, which is implemented by two pivot levers 234*a* and 234*b* on both sides of the mast 220 in the x direction, and which allows the mast 220 to pivot about an axis running in the y direction, which is driven by a first actuator 230 oriented in the x direction.

The configuration of the second bearing arrangement 234 with the aid of the two pivot levers 234*a* and 234*b* also forms, in a manner similar to the embodiment of FIGS. 3*a* and 3*b*, an effective axis running along the x direction, which is formed by a solely-rotatably mounted shaft 236 connected to the two pivot levers 234*a* and 234*b*. This shaft 236 allows a pivoting or a pitching of the mast 220 that can be driven by a second actuator 232 which, in a manner analogous to the embodiment shown in FIGS. 3*a* and 3*b*, causes the first bearing arrangement 228 to be displaced in the y direction. Thus, the embodiments of FIGS. 3*a* and 3*b* as well as 4*a* and 4*b* correspond in terms of the possible degrees of freedom and drivable pivoting movements of the masts 120 and 220, but differ in the design of their respective further bearing arrangements 134 and 234 and the positioning and mode of operation of their actuators 130*a* and 130*b,* and 230, respectively.

FIGS. 5*a* and 5*b* show a third embodiment of a narrow aisle truck according to the invention, which is denoted by the reference numeral 300, and which also has significant overlaps with the embodiment 100 of FIGS. 3*a* and 3*b.*

In particular, the two embodiments mentioned follow the same concepts with regard to their first bearing arrangements 128 and 328, and with regard to an actuator 132 and 332 acting thereon in the y direction. Likewise, the mast 320 of FIGS. 5*a* and 5*b* is also arranged to be floating with respect to a plane running in the x direction and z direction and pivotable about an effective axis X330 with respect to the vehicle body 312. However, in the embodiment 300 shown in FIGS. 5*a* and 5*b,* only a single actuator 330 is provided for displacing the mast 320 in the z direction, which actuator can only act on one side thereof.

On the opposite side of the mast 320 in the z direction, the actuator 330 is opposite a radial spherical plain bearing 331, which both allows the pivoting of the mast 320 about the already mentioned effective axis X330 and itself forms a pivot axis running in the y direction, which allows the pivoting driven by the actuator 330 within the bearing plane. Here, the actuator 330 and the radial spherical plain bearing 331 together form a further bearing arrangement 334. Although in this embodiment the pivot point for the mentioned pivoting lies in the bearing plane outside the mast 320 itself, this does not impair the effectiveness and efficiency of a pivoting movement driven in this way.

In this embodiment, a further variant is also conceivable in which the bearing arrangement 328 also firmly clamps the mast 320 in the x direction, so that only one degree of freedom in the z direction remains in this variant of the bearing arrangement 328. In this case, a slight elastic deformation of the mast 320 between the two bearing arrangements 328 and 334 would have to be provided and accepted for a pivoting movement about the axis running in the y direction, said axis formed by means of the radial joint bearing 331.

FIGS. 6*a* and 6*b* now show a fourth embodiment 400 of a narrow aisle truck according to the invention, which substantially corresponds to the first embodiment of FIGS. 3*a* and 3*b* with regard to its bearing arrangement 428 and to an actuator 432 which displaces it. In contrast to the first embodiment, however, the further bearing arrangement 434 is formed by two bearing elements 434*a* and 434*b* which are free in the x direction and are provided on both sides of the mast 420 in the form of cylindrical sliding guide elements, which together form a further bearing arrangement 434, and allow a pitching of the mast 420 about an effective axis X430.

Although these cylindrical sliding guide elements 434*a* and 434*b* can also have a certain amount of play in the z direction, in any case they provide a degree of freedom in the x direction for pivoting the mast 420 about a pivot axis running substantially in the y direction, which possibly requires a torsion of the mast due to it being fixed in the z direction. In order to drive this pivoting, an actuator 430 is again provided, which drives a displacement of the mast 420 in the x direction in the region of the further bearing arrangement 434. In this case, the bearing arrangement 428 can in turn be designed such that it only allows a movement in the z direction of the mast 420, and thus the pivoting movement about the pivot axis running in the y direction is brought about by an elastic bending of the mast 420. This embodiment is characterised by simple and inexpensive bearing arrangements and, due to the relatively strong similarities with narrow aisle trucks that are already in production, further synergy effects can be achieved.

A fifth embodiment of a narrow aisle truck according to the invention is shown in FIGS. 7*a* to 7*c,* and is denoted by the reference numeral 500. This embodiment 500 is characterised in that two actuators 530*a* and 530*b* are provided in the region of the bearing arrangement 528, which act on the mast at an angle to one another, and for this purpose are arranged as an isosceles triangle with the width direction of the narrow aisle truck 500.

In this embodiment, the bearing arrangement 528 allows the mast 520 to move in the x-y plane, and the further bearing arrangement 534 forms a centre of rotation for pivoting the mast 520 about the respective axes—both about the x direction and about the y direction. Because the two actuators 530*a* and 530*b* can now be operated in a coordinated manner, vibrations about axes running parallel to the x direction, as well as parallel to the y direction, can be driven in a suitable manner, wherein the degrees of freedom are exactly determined and fewer bearing points are necessary due to the provision of the centre of rotation in the region of the further bearing arrangement 534. Furthermore, the bearings used can be designed to run particularly smoothly, and also a greater level compensation, in particular with regard to a rotation about the x axis, can be easily implemented.

The embodiment of FIGS. 8*a* to 8*c,* which is denoted there by the reference numeral 600, and comprises two variants that are shown in FIGS. 8*b* and 8*c,* represents in a certain way a modification of the embodiment 500 of FIGS. 7*a* to 7*c,* since a further bearing arrangement 634 is also provided in this case, which allows a centrally placed centre of rotation for pivoting the mast 620 about an axis parallel to the y direction. For this purpose, in the variant of FIG. 8*b,* an arcuate linear guide 634*a* is provided as a further bearing arrangement 634, while in the variant of FIG. 8*c* a slewing ring bearing 634*b* is used as a further bearing arrangement 634.

The actuator 630 acting in the x direction can thus in both variants cause a pivoting about the given axis running through the bearing arrangement 634 and in the y direction, while the corresponding bearing points are also designed in such a way that actuating a further actuator 632 oriented in the y direction, which allows a displacement of the bearing arrangement 628, causes a pivoting of the mast about an effective axis X634 running through the bearing point and in the x direction. In this embodiment, too, the degrees of freedom for pivoting the mast are exactly determined, and no additional translation in the z direction is necessary in the bearing points. A smooth-running bearing is thus possible, and greater level compensations, in particular in the case of a rotation about the pivot axis parallel to the y direction, can be easily implemented.

Finally, a seventh embodiment of a narrow aisle truck according to the invention is shown in FIGS. 9*a* and 9*b,* and is denoted by the reference numeral 700. In this embodiment, the bearing arrangement 728 is formed by a slewing ring bearing which is arranged centrally on the underside of the mast 720, in particular with regard to the vertical direction, in the region of the wheels 714*a,* 714*b* and 718 of the narrow aisle truck 700. This bearing arrangement 728 allows the mast 720 to be pivoted both about a pivot axis running in the x direction X728 and about a pivot axis Y728 running in the y direction.

In order to drive the corresponding pivoting movements, an actuator 730 designed as a rotating spindle and, on the other hand, a further actuator 732 designed as a cylinder, which can also move the rotating spindle 730 in the y direction, are provided. The rotating spindle 730 thus drives the pivoting of the mast 720 about the pivot axis Y728 running in the y direction, while the cylinder 732 drives the pivoting of the mast 720 about the pivot axis X728 running in the x direction.

Finally, it should be pointed out that many of the embodiments discussed above can also be implemented in variants with fewer degrees of freedom; for example, in the embodiments of FIGS. 3*a* to 6*b*, each of the bearing arrangements 128, 228, 328 or 428 could be fixed to the corresponding vehicle body 112, 212, 312 or 412, so that the further actuators 132, 232, 332 or 432 and thus the possibility of stimulating the respective mast 120, 220, 320 or 420 to pitching movements, would be dispensed with. It should also be noted that the present invention is not limited to narrow aisle trucks with three wheels, of which only one is driven and steered, but that other configurations are also conceivable, for example with four wheels, two of which are driven and the other two are steered.

The invention claimed is:

1. A narrow aisle truck, comprising:

a vehicle body having a length direction and a width direction;

wheels assigned to the vehicle body and arranged on two axes running in the width direction of the vehicle body and configured to drive and steer the narrow aisle truck when driving on a driving surface;

a drive system configured to exert an acceleration torque on at least one of the wheels;

a mast extending substantially vertically, between the two axes, with respect to the length direction of the vehicle body wherein the mast is movably mounted relative to the vehicle body in a floating manner with respect to a bearing plane by a bearing arrangement, wherein the bearing arrangement allows the mast to pivot relative to the vehicle body with respect to at least two degrees of freedom of movement;

at least one detection unit configured (A) to detect at least one state parameter of one or more of (i) the narrow aisle truck or (ii) surroundings of the narrow aisle truck and (B) to output corresponding data;

at least two actuators, each actuator of the at least two actuators configured to move the bearing arrangement relative to the vehicle body to cause pivot movements of the mast relative to the vehicle body, each pivot movement corresponding to a respective degree of freedom of the at least two degrees of freedom; and a control unit operatively coupled to the at least one detection unit and the at least two actuators and configured to:

determine a current state of the narrow aisle truck based on the at least one state parameter detected by the at least one detection unit;

determine an effect of an actuation of one or more of the at least two actuators on the current state; and activate at least one of the at least two actuators to reduce a difference between the determined current state and a predetermined target state, wherein the predetermined target state corresponds to the mast being vertically aligned regardless of a slope of the driving surface.

2. The narrow aisle truck of claim 1, wherein the control unit is further operatively coupled to the drive system and is further configured to:

determine an effect of a modulation of the acceleration torque exerted by the drive system on at least one wheel on the current state; and control the drive system so that the difference between the determined current state and predetermined target state is reduced.

3. The narrow aisle truck of claim 1, wherein the at least one detection unit is configured to detect an inclination of one or more of the vehicle body, the mast, or the driving surface relative to a horizontal, wherein the inclination is transverse to the length direction of the narrow aisle truck.

4. The narrow aisle truck of claim 1, wherein the at least one detection unit is configured to detect, for one or more of (A) the vehicle body or (B) the mast, one or more of (i) an acceleration or (ii) a vibration.

5. The narrow aisle truck of claim 1, wherein the at least one detection unit is configured to detect a relative or absolute position of the narrow aisle truck, and wherein the detection unit is also assigned a memory unit operatively coupled to the control unit, wherein topology data pertaining to the driving surface accessible to the narrow aisle truck is stored in the memory unit.

6. The narrow aisle truck of claim 1, wherein the control unit is further configured to classify possible disturbances on the basis of the at least one state parameter detected by the at least one detection unit.

7. The narrow aisle truck of claim 1, wherein at least one of the at least two actuators comprises one or more of: a single-acting hydraulic cylinder, a double-acting hydraulic cylinder, a linear motor, a stepping motor, a threaded spindle, a rack drive, an electromagnet or a piezo element.

8. The narrow aisle truck of claim 1, wherein at least one of the at least two actuators comprises a hydraulic cylinder with a variable spring preload.

9. The narrow aisle truck of claim 1, wherein the bearing arrangement comprises a damping element configured to dampen a movement of the mast relative to the vehicle body along at least one direction.

10. The narrow aisle truck of claim 1, wherein the bearing plane that extends substantially vertically and in the width direction of the vehicle body, wherein at least one of the at least two actuators is configured to displace the mast in the vertical direction relative to the vehicle body.

11. The narrow aisle truck of claim 10, wherein, as a result of a coupling of the at least one actuator to the mast, an effective axis running in a substantially horizontal direction is formed for displacing the mast in the vertical direction so that an actuation of the at least one actuator to move the bearing arrangement relative to the vehicle body leads to a pivoting of the mast about the effective axis.

12. The narrow aisle truck of claim 10, wherein the at least two actuators comprise two actuators arranged on opposite sides of the mast.

13. The narrow aisle truck of claim 1, further comprising a further bearing arrangement configured to allow a pivoting of the mast about an axis extending perpendicular to the bearing plane, wherein an arranged actuator drives the pivoting.

14. The narrow aisle truck of claim 13, wherein the further bearing arrangement is also configured to allow the mast to pivot about a further axis lying in the bearing plane.

15. The narrow aisle truck of claim 13, wherein the further bearing arrangement and at least one of the at least two actuators are arranged on opposite sides of the mast with respect to the width direction of the vehicle body.

16. The narrow aisle truck of claim 15, wherein an effective axis running substantially in a horizontal direction is formed by the at least one actuator for pivoting the mast and the further bearing arrangement, wherein the narrow aisle truck comprises a coupling of the at least one actuator and the further bearing arrangement to the mast so that an actuation of the actuator to move the bearing arrangement relative to the vehicle body leads to a pivoting of the mast about the effective axis.

17. The narrow aisle truck of claim 1, wherein the mast is mounted by means of the bearing arrangement in a manner allowing a vertical movement, wherein the mast is mounted movably with respect to the width direction of the vehicle body by means of a further bearing arrangement, wherein at least one actuator is configured to move the mast in a region of the further bearing arrangement in the width direction of the vehicle body to cause the mast to pivot by elastic torsion.

18. The narrow aisle truck of claim 17, wherein the bearing arrangement is movable with respect to the vehicle body by a first actuator of the at least two actuators and, wherein an effective axis running in a substantially horizontal direction is formed by the further bearing arrangement so that an actuation of the first actuator to move the bearing arrangement relative to the vehicle body leads to a pivoting of the mast about the effective axis.

19. The narrow aisle truck of claim 1, further comprising a further bearing arrangement configured to allow the mast to pivot about a stationary pivot axis running in the length direction of the vehicle body, wherein at least one of the at least two actuators is configured to cause the mast to pivot about the pivot axis.

20. The narrow aisle truck of claim 19, wherein the further bearing arrangement is further configured to allow a movement of the mast along the pivot axis, wherein the at least two actuators comprise two actuators arranged to act on the mast at an angle to one another.

21. The narrow aisle truck of claim 20, wherein the two actuators form a triangle together with the width direction of the vehicle body.

22. The narrow aisle truck of claim 21, wherein the triangle comprises an isosceles triangle or an equilateral triangle.

23. The narrow aisle truck of claim 1, further comprising a further bearing arrangement comprising an arcuate linear guide or a slewing ring bearing, wherein the arcuate linear guide or the slewing ring bearing is configured to pivot the mast about a pivot point arranged centrally on the mast in the width direction of the vehicle body, wherein at least one actuator of the at least two actuators is configured to cause the mast to pivot about the pivot point.

24. The narrow aisle truck of claim 23, wherein the further bearing arrangement is further configured to allow pivoting of the mast about an effective axis running substantially horizontally in the width direction of the vehicle body through the pivot point, wherein a further actuator is arranged in such a way that an actuation of the further actuator leads to a pivoting of the mast about the effective axis.

25. The narrow aisle truck of claim 1, wherein the bearing arrangement is configured to allow pivoting of the mast about a stationary pivot axis running in the length direction of the vehicle body, at least one of the at least two actuators is configured to cause the mast to pivot about the stationary pivot axis, wherein the stationary pivot axis is arranged centrally with respect to the width direction of the vehicle body on an underside of the mast.

26. The narrow aisle truck of claim 25, further comprising a further bearing arrangement vertically above the bearing arrangement that allows a movement of the mast in the width direction of the narrow aisle truck.

27. The narrow aisle truck of claim 26, wherein the at least one actuator for pivoting the mast about the stationary pivot axis and the further bearing arrangement is formed as an assembly.

28. The narrow aisle truck of claim 26, wherein the further bearing arrangement comprises a roller guide.

29. The narrow aisle truck of claim 25, wherein the bearing arrangement is further configured to allow pivoting of the mast about an effective axis running substantially in the width direction of the vehicle body, and wherein the further bearing arrangement is arranged to be movable by a further actuator with respect to the vehicle body so that actuation of the further actuator causes the mast to pivot about the effective axis.

30. The narrow aisle truck of claim 25, wherein the bearing arrangement comprises a slewing ring bearing or a bearing pin.

31. The narrow aisle truck of claim 25, wherein the stationary pivot axis is arranged centrally with respect to the vertical direction in the region of the wheels of the narrow aisle truck.

* * * * *